United States Patent
Hao et al.

(12) 
(10) Patent No.: US 6,576,768 B1
(45) Date of Patent: Jun. 10, 2003

(54) PREPARATION OF ALKYLTHIO- AND/OR ARYLTHIO-SUBSTITUTED DIKETO-DIARYL-PYRROLOPYRROLES

(75) Inventors: Zhimin Hao, Riehen (CH); Alain Claude Rochat, Fribourg (CH); Nancy Schlöder-Tebaldi, Matran (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 131 days.

(21) Appl. No.: 09/294,483

(22) Filed: Apr. 20, 1999

(30) Foreign Application Priority Data

Apr. 22, 1998 (CH) ................................. 915/98

(51) Int. Cl.⁷ ............................................ C07D 487/04
(52) U.S. Cl. ...................................................... 548/453
(58) Field of Search ......................................... 548/453

(56) References Cited

U.S. PATENT DOCUMENTS

| | | | |
|---|---|---|---|
| 4,490,542 A | * 12/1984 | Iqbal et al. | 548/453 |
| 4,579,949 A | 4/1986 | Rochat et al. | 546/167 |
| 4,632,893 A | * 12/1986 | Rochat et al. | 430/58 |
| 4,778,899 A | * 10/1988 | Pfenninger et al. | 548/453 |
| 5,200,528 A | 4/1993 | Wooden et al. | 548/453 |
| 5,484,943 A | 1/1996 | Zambounis et al. | 548/453 |
| 5,561,232 A | 10/1996 | Hao et al. | 546/14 |
| 5,616,725 A | 4/1997 | Zambounis et al. | 548/453 |

OTHER PUBLICATIONS

Mar., Advanced Organic Chemistry—Reactions, Mechanisms and Structure, 3rd Ed., John Wiley & Sons, New York, 1985, pp. 360, 589 and 590, 1985.*
Ilsong Rhee et al., Chemistry Letters, pp. 15–16, (1978).

* cited by examiner

Primary Examiner—Laura L. Stockton
(74) Attorney, Agent, or Firm—David R. Crichton

(57) ABSTRACT

Preparation of alkylthio and/or arylthio-substituted diketo-diaryl-pyrrolopyrroles (DPPs) of the formula Ia and dithio-bridged bis-diketo-diaryl-pyrrolopyrroles (bis-DPPs) of the formula Ib

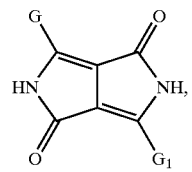

Ia

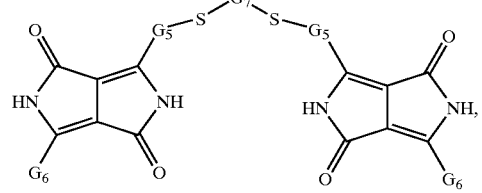

Ib in which in formula Ia G is phenyl substituted by at least one arylthio or alkylthio group, and $G_1$ is G or a carbocyclic or heterocyclic radical, by reacting a haloaryl with a thiol or thiolate, and in formula Ib $G_5$ is a phenylene, $G_6$ is $G_1$ but not G, and $G_7$ is alkylene, cycloalkylene or phenylene, by reacting two haloaryls with a dithiol or dithiolate, which comprises reacting a thiol or thiolate with a halo-diketo-diaryl-pyrrolopyrrole ("halo-DPP") of the formula IIa

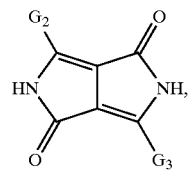

IIa in which $G_2$ is a halogenated phenyl group and $G_3$ is $G_2$ or $G_1$, or reacting a dithiol or dithiolate with two halo-diketo-diaryl-pyrrolopyrroles ("halo-DPPs") of the formula IIb

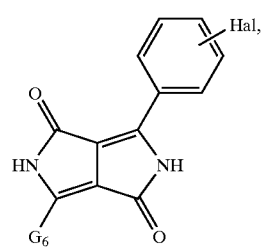

IIb in which Hal is halogen such as fluorine, chlorine, bromine or iodine, and $G_6$ is $G_1$, and also novel DPPs and also bis-DPPs, compositions comprising the DPPs of the formula Ia prepared in accordance with the invention, and their uses.

7 Claims, No Drawings

PREPARATION OF ALKYLTHIO- AND/OR ARYLTHIO-SUBSTITUTED DIKETO-DIARYL-PYRROLOPYRROLES

The present invention relates to an improved process for preparing alkylthio- and/or arylthio-substituted diketo-diaryl-pyrrolopyrroles (DPPs) of the formula Ia and dithio-bridged bis-diketo-diaryl-pyrrolopyrroles (bis-DPPs) of the formula Ib

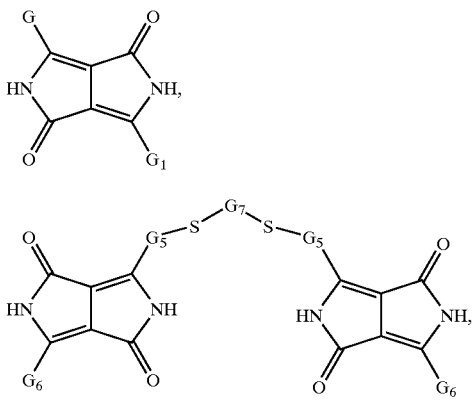

in which in formula Ia
  G is phenyl substituted by at least one arylthio or alkylthio group, and
  $G_1$ is G or a carbocyclic or heterocyclic radical, by reacting a haloaryl with a thiol or thiolate, and
in formula Ib
  $G_5$ is a phenylene, $G_6$ is $G_1$ but not G, and $G_7$ is alkylene or phenylene, by reacting two haloaryls with a dithiol or dithiolate.

The invention additionally relates to novel, arylthio- or alkylthio-substituted DPPs, their use, and compositions comprising the DPPs of the invention.

U.S. Pat. No. 4,579,949 and U.S. Pat. No. 4,490,542 describe the preparation of DPPs substituted by at least one thioether group by reacting arylthio- or alkylthio-substituted benzonitriles with succinic esters. Disadvantages are the low yields in the case of long-chain alkylthio-DPPs and the impossibility of obtaining water-soluble compounds.

The reaction of DPP pigments with thiols to give alkylthio- or arylthio-substituted DPPs gives incomplete conversions owing to the poor solubility of these pigments.

Chemistry Letters 1978, 13–14 discloses that unactivated haloaryls can be substituted only in the presence of catalysts.

It was therefore an object of the invention to provide an improved process for preparing alkylthio- and/or arylthio-substituted DPPs which permits in particular the preparation of water-soluble compounds and long-chain alkylthio-DPPs. In particular, the process should be operable without high pressures and the use of catalysts. In addition, the economics of the process should be guaranteed by high yields. Furthermore, the invention was to provide novel, thioether-substituted diketo-diaryl-pyrrolopyrroles and also dithioether-bridged bis-DPPs which can be used in compositions with high molecular mass organic material, in particular as colorants. In addition, the thioether-substituted DPPs should be able to be used, in particular, as crystal growth inhibitors or rheology enhancers.

Accordingly, we have found the process defined at the outset, which involves reacting a thiol or thiolate with a halo-diketo-diaryl-pyrrolopyrrole ("halo-DPP") of the formula IIa

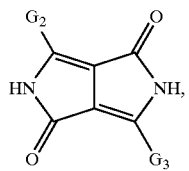

in which $G_2$ is an unsubstituted or substituted, halogenated phenyl group and $G_3$ is $G_2$ or $G_1$, or
reacting a dithiol or dithiolate with two halo-diketo-diaryl-pyrrolopyrroles ("halo-DPPs") of the formula IIb

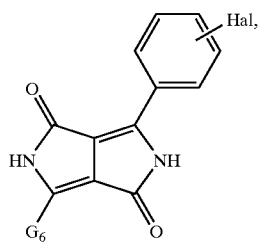

in which Hal is halogen such as fluorine, chlorine, bromine or iodine, preferably chlorine or bromine and, with particular preference, chlorine,
Hal being, in particular, in the para position of the phenylene.

Customarily, the reaction is started by bringing the thiol and/or thiolate or the dithiol and/or the dithiolate into contact with the halo-DPP IIa or IIb by conventional methods, for example by mixing the starting materials or by dropwise addition of one starting material to the other.

To prepare the compounds of the formula Ia the molar ratio of thiol to halo-DPP of the formula IIa is generally chosen to be within the range from 0.1:1 to 20:1, preferably in the range from 2:1 to 5:1 and, with particular preference, in the range from 2.1:1 to 2.7:1, and, to prepare the compounds of the formula Ib, the molar ratio of dithiol to halo-DPP of the formula IIb is generally chosen to be in the range from 0.5:1 to 20:1, preferably in the range from 0.5:1 to 5:1 and, with particular preference, in the range from 1:1 to 2.7:1.

Preferably, the reaction temperature is chosen to be within the range from 323 to 453 K, preferably in the range from 333 to 433 K, with particular preference in the range from 343 to 423 K and, with very particular preference, in the range from 343 to 413 K.

The reaction pressure is chosen to be generally within the range from 70 kPa to 10 MPa, preferably from 90 kPa to 5 MPa; atmospheric pressure is particularly preferred.

The reaction time depends generally on the reactivity of the starting materials, the chosen reaction temperature and the desired conversion. The reaction time is customarily chosen to be within the range from 15 minutes to 2 days.

In one preferred embodiment the reaction is conducted under an inert gas atmosphere using for this purpose preferably nitrogen or noble gases such as helium or argon. Particular preference is given to reaction in a nitrogen atmosphere.

In addition, the reaction can be carried out with or without solvent, with preference being given to reaction in a solvent. Preferred solvents are organic solvents or solvent mixtures such as aprotic, especially non-aqueous aprotic, solvents.

Aprotic solvents may be apolar, such as benzene, chlorobenzene and chlorinated hydrocarbons, or polar. The latter are particularly preferred. Examples of polar aprotic solvents which can be used are amides such as hexamethylphosphoramide, carboxamides such as N,N'-dimethylformamide and N,N'-dimethylacetamide, or lactams such as N-methylpyrrolidone, N-methyl-2-piperidone, 1,3-dimethyl-3,4,5,6-tetrahydro-3(1H)pyrimidinone or N-methyl-4-piperidone, or urea bases such as N,N'-dimethylethyleneurea, N,N'-dimethyl propyleneurea, and also acetonitrile, sulfolane, dimethyl sulfoxide, or aromatic solvents such as nitrobenzene.

Preference is given to N,N'-dimethylformamide, N,N'-dimethylacetamide, dimethyl sulfoxide, 1,3-dimethyl-3,4,5,6-tetrahydro-3(1H)pyrimidinone or N-methyl-pyrrolidone.

The weight ratio of halo-DPP IIa or halo-DPP IIb to the solvent lies in general within the range from 0.5 to 10% by weight, with particular preference in the range from 1 to 5% by weight and, with very particular preference, in the range from 2 to 3% by weight.

In another preferred embodiment the reaction is conducted in the presence of a base. Examples of suitable bases are alkali metal carbonates, for example $Na_2CO_3$ or $K_2CO_3$, alkali metal hydrogencarbonates, for example $NaHCO_3$ or $KHCO_3$, alkali metal hydroxides, for example NaOH or KOH, alkali metals, such as sodium or potassium, and also aromatic bases, such as pyridine, N,N'-dimethylaminopyridine or quinoline. Preference is given to non-aqueous alkali metal bases and to aromatic bases, particular preference to non-aqueous alkali metal carbonates or alkali metal hydrogencarbonates, and very particular preference to anhydrous $K_2CO_3$.

The molar ratio of base to thiol or thiolate lies customarily within the range from 0.5:1 to 5:1, preferably in the range from 1:1 to 4:1 and, with particular preference, in the range from 1:1 to 3:1, and the molar ratio of base to dithiol or dithiolate lies customarily within the range from 1:1 to 10:1, preferably within the range from 1:1 to 5:1 and, with particular preference, in the range from 1:1 to 4:1.

In a preferred embodiment of the process of the invention the reaction is conducted in the presence of a solvent or solvent mixture and a base.

If desired, the reaction can also be conducted in the presence of catalysts, especially transition metal catalysts, examples being tetrakis(triphenyl-phosphine)palladium(0), -nickel(0), and -platinum(0), and -ruthenium(II) chloride. Preferably, the reaction is conducted without a catalyst.

If a catalyst is used, it is generally employed in a proportion within the range from 0.001 to 10% by weight, based on halo-DPP of the formula IIa or IIb, and preferably from 0.5 to 7% by weight and, with particular preference, from 2 to 5% by weight based on the total amount of reactants.

The reaction mixture can be worked up by conventional methods, for example by filtration and subsequent washing of the filter residue and subsequent optional drying. The product may be an individual compound or a mixture of differently substituted compounds of the formula Ia, or a mixture consisting of halo-DPP IIa and a compound of the formula Ia, or else a mixture consisting of halo-DPP IIb and a compound of the formula Ib and/or Ia.

In accordance with observations made to date the thiol or thiolate employed can comprise any known thiols or thiolates, examples being substituted or unsubstituted aryl or alkyl thiolates, it being possible for the latter to be branched or straight-chain, uninterrupted, or interrupted one or more times by heteroatoms.

In a preferred embodiment a thiol or thiolate of the formula IIIa or a dithiol or dithiolate of the formula IIIb is used.

   IIIa,
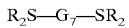   IIIb in which $R_1$ can be $C_1$–$C_{30}$alkyl which can be uninterrupted or interrupted one or more times by heteroatoms, such as —O— or —S—, or by —NH—, —C(O)O—, —O—C(O)— or —C(O)—NH—, and can be substituted or unsubstituted, or can be $C_5$–$C_{12}$cycloalkyl or phenyl, each of which can be substituted or unsubstituted, and $R_2$ is hydrogen, a cation ("M") of an alkali metal, or an organic nitrogen base, and $G_7$ can be $C_1$–$C_{30}$alkylene which can be uninterrupted or interrupted one or more times by heteroatoms, such as —O— or —S—, or by —NH—, —C(O)O—, —O—C(O)— or —C(O)—NH—, and can be substituted or unsubstituted, or can be $C_5$–$C_{12}$cycloalkylene or phenylene, each of which can be substituted or unsubstituted.

$C_1$–$C_{30}$alkyl is methyl, ethyl, propyl, isopropyl, n-butyl, isobutyl, sec-butyl, tert-butyl, n-pentyl, sec-amyl, tert-amyl, hexyl, 2,2-dimethylbutyl, heptyl, octyl, 2-ethylhexyl, 1,1',3,3'-tetramethylbutyl, nonyl, decyl, dodecyl, tetradecyl, hexadecyl, octadecyl, eicosyl, heneicosyl, docosyl, tetracosyl, pentacosyl, hexacosyl, heptacosyl, octacosyl or nonacosyl, preference being given to $C_1$–$C_{18}$alkyl such as methyl, ethyl, propyl, isopropyl, n-butyl, isobutyl, sec-butyl, tert-butyl, n-pentyl,sec-amyl, tert-amyl, hexyl, 2,2-dimethylbutyl, heptyl, octyl, 2-ethylhexyl,1,1',3,3'-tetramethylbutyl, nonyl, decyl, dodecyl, tetradecyl, hexadecyl and octadecyl and particular preference to $C_8$–$C_{18}$alkyl such as octyl, 2-ethylhexyl, 1,1',3,3'-tetramethylbutyl, nonyl, decyl, undecyl, dodecyl, tridecyl, tetradecyl, pentadecyl, hexadecyl, heptadecyl or octadecyl and very particular preference to $C_{12}$–$C_{18}$alkyl such as dodecyl, tridecyl, tetradecyl, pentadecyl, hexadecyl, heptadecyl or octadecyl; particular preference is also given to $C_1$–$C_8$alkyl such as methyl, ethyl, propyl, isopropyl, n-butyl, iso-butyl, sec-butyl, tert-butyl, n-pentyl, sec-amyl, tert-amyl, hexyl, 2,2'-dimethylbutyl, heptyl, octyl, 2-ethylhexyl and 1,1',3,3'-tetramethylbutyl.

$C_1$–$C_{30}$alkylene is methylene, ethylene, propylene, isopropylene, n-butylene, isobutylene, sec-butylene, tert-butylene, n-pentylene, sec-amylene, tert-amylene, hexylene, 2,2'-dimethylbutylene, heptylene, octylene, 2-ethylhexylene, 1,1',3,3'-tetramethylbutylene, nonylene, decylene, dodecylene, tetradecylene, hexadecylene, octadecylene, eicosylene, heneicosylene, docosylene, tetracosylene, pentacosylene, hexacosylene, heptacosylene, octacosylene or nonacosylene, preference being given to $C_1$–$C_{18}$alkylene such as methylene, ethylene, propylene, isopropylene, n-butylene, isobutylene, sec-butylene, tert-butylene, n-pentylene, sec-amylene, tert-amylene, hexylene, 2,2'-dimethylbutylene, heptylene, octylene, 2-ethylhexylene, 1,1',3,3'-tetramethylbutylene, nonylene, decylene, dodecylene, tetradecylene, hexadecylene or octadecylene, and particular preference to $C_8$–$C_{18}$alkylene such as octylene, 2-ethylhexylene, 1,1',3,3'-tetramethylbutylene, nonylene, decylene, dodecylene, tetradecylene, hexadecylene or octa-decylene; in addition, particular preference is given to $C_1$–$C_8$alkylene such as methylene, ethylene, propylene, isopropylene, n-butylene, isobutylene, sec-butylene, tert-butylene, n-pentylene, sec-amylene, tert-amylene, hexylene, 2,2'-dimethylbutylene, heptylene, octylene, 2-ethyl-hexylene or 1,1',3,3'-tetramethylbutylene.

$C_5$–$C_{12}$cycloalkyl is for example cyclopentyl, cyclohexyl, cycloheptyl or cyclooctyl, preferably $C_5$–$C_6$cycloalkyl such as cyclopentyl or cyclohexyl.

$C_5$–$C_{12}$cycloalkylene is for example cyclopentylene, cyclohexylene, cycloheptylene or cyclooctylene, preferably $C_5$–$C_6$cycloalkylene such as cyclopentylene or cyclohexylene.

Alkyl radicals or alkylene radicals of at least two carbon atoms, represented by $R_1$ or $G_7$, can be interrupted one or more times by for example —O—, —NH—, —C(O)O—, —O—C(O)—, —C(O)—NH—; preference is given to —C(O)O— or —O— and very particular preference to the —C(O)O— interrupted alkyl radical —CH$_2$—C(O)O—CH$_2$CH$_3$, or the singly —O-interrupted alkyl radical such as —CH$_2$—CH$_2$—O—CH$_2$—CH$_3$, or the doubly —O-interrupted alkyl radical such as —CH$_2$—CH$_2$—O—CH$_2$—CH$_2$—O—CH$_2$—CH$_3$.

In addition, the alkyl or cycloalkyl radicals or the phenyl radical of $R_1$ can be substituted by, for example, the following radicals: $C_1$–$C_{18}$alkyl, OR$_3$, S—R$_3$, C(O)R$_3$, COOR$_3$, —OCOR$_3$, SO$_3$R$_3$, SO$_2$R$_3$, PO$_3$R$_3$, Si(OR)$_3$, a salt radical such as S—M, O—M, COOM, SO$_3$M, PO$_3$M, P(R$_3$)$_3^+$X$^-$, P((R$_3$)$_2$R$_4$)$_3^+$X$^-$, NO$_2$, N(R$_3$)$_3^+$X$^-$, N((R$_3$)$_2$R$_4$)$_3^+$X$^-$ or a nitrogen-containing radical, in which $R_3$ and $R_4$ independently of one another are hydrogen, $C_1$–$C_{18}$alkyl, especially methyl, ethyl, propyl, isopropyl, n-butyl, isobutyl, sec-butyl, tert-butyl, n-pentyl, sec-amyl, tert-amyl, hexyl or 2,2-dimethylbutyl, or are $C_5$–$C_6$cycloalkyl or unsubstituted or $R_7$-substituted phenyl, M is a cation of an alkali metal, preferably sodium or potassium, X$^-$ is a halide, such as fluoride, chloride, bromide or iodide, and $R_7$ is hydrogen, halogen such as F, Cl, Br, I or is $C_1$–$C_8$alkyl or unsubstituted or NR$_3$R$_4$-substituted $C_5$–$C_6$cycloalkyl.

Preferred OR$_3$ is OH, and preferred S—R$_3$ is SH.

Preferred radicals COOR$_3$ are COOH, COOCH$_3$, COOC$_2$H$_5$, COOC$_4$H$_9$, COOC$_5$H$_{11}$, and preferred —OCOR$_3$ is —O—CO—C(CH$_2$)—CH$_3$.

Preferred radicals SO$_3$R$_3$ are SO$_3$H, SO$_3$(C$_5$H$_4$)R$_7$, SO$_3$(C$_5$H$_5$), SO$_3$CH$_3$, SO$_3$C$_2$H$_5$, and preferred radicals SO$_2$R$_3$ are SO$_2$(C$_5$H$_4$)R$_7$, SO$_2$(C$_5$H$_4$) or SO$_2$CH$_3$.

Preferred radicals PO$_3$R$_3$ are PO$_3$H, PO$_3$(C$_5$H$_4$)R$_7$ or PO$_3$CH$_3$.

Preferred nitrogen-containing radicals are selected from the group consisting of NR$_3$R$_4$, especially NH$_2$, NHR$_3$ or N(R$_3$ R$_4$), with particular preference being given to substituted alkyl radicals, such as (R$_3$ R$_4$)N—(C$_1$–C$_{30}$alkyl)-, especially (CH$_3$)$_2$N—C$_2$H$_5$—, further preferred nitrogen-containing radicals are selected from the group consisting of CONHNH$_2$, CONHR$_3$, NHCOR$_3$, NCO and a heterocyclic radical and a compound selected from the group of the formulae IV to IX

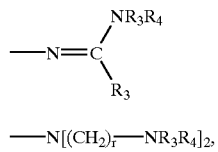

IV

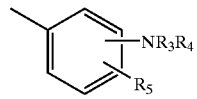

VI

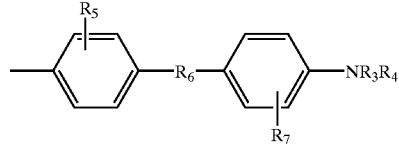

VII

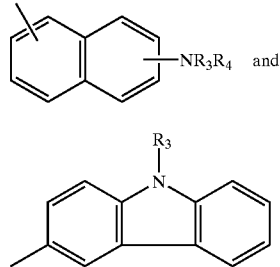

VIII

—N[(CH$_2$)$_r$—NR$_3$R$_4$]$_2$,

V

IX selected in particular from the group of the compounds of the formulae IV and V,
in which
$R_5$ independently of $R_7$ has the same definition as $R_7$, and $R_6$ is a direct bond, —CH$_2$—, —CH(CH$_3$)—, —C(CH$_3$)$_2$—, —CH=N—, —N=N—, —O—, —S—, —SO—, —SO2— or —NR$_3$—, and
r is zero or an integer from 1 to 17.

Furthermore, the alkylene, cycloalkylene or phenylene radical of $G_7$ can be substituted by, for example, the following radicals:
halogens such as fluorine, chlorine, bromine or iodine, preferably chlorine or bromine and, with particular preference, chlorine;
—E—$C_1$–$C_{18}$alkyl,
in which
E is —O—, —S—, —NH—, —C(O)O—, —OC(O)—, —NHC(O)—, —C(O)NH—;
CN, NO$_2$, CF$_3$ or $C_1$–$C_{18}$alkyl, which can be uninterrupted or interrupted one or more times by heteroatoms, such as —O— or —S—, or by —NH—, —C(O)O—, —O—C(O)— or —C(O)—NH—.

If E is —O—, then —O—$C_1$–$C_{18}$alkyl can be methoxy, ethoxy, n-propoxy, isopropoxy, hexadecyloxy or octadecyloxy, preferably methoxy or ethoxy and, with very particular preference, methoxy.

If E is —S—, then —S—$C_1$–$C_{18}$alkyl can be methylmercapto, ethylmercapto, n-propylmercapto, isopropylmercapto, hexadecylmercapto or ocatdecylmercapto, preferably methylmercapto or ethylmercapto and, with very particular preference, methylmercapto.

If E is —NH—, then —NH—$C_1$–$C_{18}$alkyl can be methylamine, ethylamine, n-propylamine, isopropylamine, hexadecylamine or octadecylamine, preferably methylamine or ethylamine and, with very particular preference, methylamine.

If E is —C(O)O— then —C(O)O—$C_1$–$C_{18}$alkyl can be methoxycarbonyl, ethoxycarbonyl, n-propoxycarbonyl, isopropoxycarbonyl, hexadecoxycarbonyl or octadecoxycarbonyl, preferably methoxycarbonyl or ethoxycarbonyl and, with very particular preference, methoxycarbonyl.

If E is —OC(O)— then —OC(O)—$C_1$-$C_{18}$alkyl can be a methyl, ethyl, n-propyl, isopropyl, hexadecyl or octadecyl ester radical, preferably a methyl or ethyl ester radical and, with very particular preference, a methyl ester radical.

If E is —C(O)NH— then —C(O)NH—$C_1$-$C_{18}$alkyl can be a methyl-, ethyl-, n-propyl-, isopropyl-, hexadecyl- or octadecylaminocarbonyl radical, preferably a methyl- or ethylaminocarbonyl radical and, with very particular preference, methyl-aminocarbonyl radical.

If E is —NHC(O)— then —NHC(O)—$C_1$-$C_{18}$alkyl can be a methyl-, ethyl-, n-propyl-, isopropyl-, hexadecyl- or octadecylcarbonylamino radical, preferably a methyl- or ethylcarbonylamino radical and, with very particular preference, methylcarbonylamino radical.

Preferred substituted alkylene radicals for $G_7$ are symmetrically substituted radicals such as —$(CH_2)_m$—CH($C_1$-$C_{30}$alkyl)—$(CH_2)_m$— or —$(CH_2)_m$—C($C_1$-$C_{30}$alkyl)$_2$—$(CH_2)_m$—, in which m is an integer in the range from 1 to 14, with particular preference an integer in the range from 3 to 8.

Preferred substituted phenylene radical $G_7$ possesses one or two substituents such as halogen, $C_1$-$C_{18}$alkyl, —O—$C_1$-$C_{18}$alkyl, —S—$C_1$-$C_{18}$alkyl, —NH—$C_1$-$C_{18}$alkyl, CN, $NO_2$ or $CF_3$, where the substituents can be identical or different.

Heterocyclic radical is, for example, a five-membered nitrogen-containing heterocyclic radical such as imidazolyl, pyrazolyl, triazolyl, pyrrolyl, pyrrolidinyl, oxazolyl or thiazolyl, a six-membered nitrogen-containing heterocyclic radical such as piperazinyl, piperidinyl, pyridinyl or morpholinyl, or a bicyclic radical which possesses a fused-on five-membered nitrogen-containing heterocycle and a six-membered aromatic ring, such as benzoxazolyl, indolyl, benzothiazolyl, benzimidazolyl or benzotriazolyl.

Examples of suitable organic nitrogen bases for $R_2$ are pyridine, morpholine, N,N'-dimethylaminopyridine and quinoline.

Particular preference is given to thiols such as $C_1$-$C_{18}$alkyl-SH, especially H—S—$(CH_2)_n$—$CH_3$, in which n is an integer from 8 to 17, H—S—$CH_2COOC_2H_5$, H—S—$CH_2CH_2COOC_2H_5$, H—S-(para-methylphenyl), H—S-(para-hydroxyphenyl), and also H—S—$(CH_2)_{n1}$—$NR_3R_4$ in which n1 is an integer from 8 to 18, H—S—$(CH_2)_2N(CH_3)_2$, and also thiolates such as sodium salts or potassium salts of ⁻S—($C_1$-$C_{18}$alkyl), ⁻S—$(CH_2)_2$—OH, ⁻S—$CH_2COOC_2H_5$, ⁻S-(para-methylphenyl), ⁻S-(para-hydroxyphenyl) or ⁻S—$(CH_2)_2N(CH_3)_2$.

Particularly preferred dithiols are —S—($C_1$-$C_{18}$alkylene)-S—, especially —S—($C_3$-$C_8$alkylene)-S—, such as —S—$(CH_2)_3$—S—, —S—$(CH_2)_4$—S—, —S—$(CH_2)_5$—S—, —S—$(CH_2)_6$—S—, —S—$(CH_2)_7$—S— or —S—$(CH_2)_8$—S—, and very particularly preferred dithiols are —S—$(CH_2)_3$—S—, —S—$(CH_2)_5$—S— or —S—$(CH_2)_6$—S—.

The thiols, dithiols or thiolates, dithiolates of the formula IIIa or IIIb are obtainable commercially or by known methods for preparing thiols, dithiols or thiolates, dithiolates (Houben-Weyl, Methoden der organischen Chemie, Volume E 11, pp. 32–63, Georg Thieme Verlag, Stuttgart, N.Y., 1985; and J. L. Wardell, "Preparation of Thiols", in S. PATAI (ed.), The chemistry of the thiol group, pp. 163–269, John Wiley & Sons, London, New York, 1974).

In the process of the invention a halo-DPP of the formula IIa is used in which $G_2$ is a halogenated phenyl group and $G_3$ is $G_2$ or $G_1$, and $G_3$ is preferably $G_2$ or a carbocyclic or heterocyclic radical and with particular preference is $G_2$; in other words, the halo-DPP of the formula IIa in that case is a symmetrically substituted halo-DPP.

If $G_3$ or $G_6$ is $G_1$, then the radical involved can also be a heterocyclic radical which corresponds to the above definition of heterocyclic radicals and is additionally pyrimidine, thiophene or furan, or else the radical involved can be a carbocyclic group of the formula XI, XII or XIII

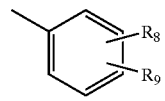

XI

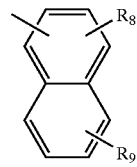

XII

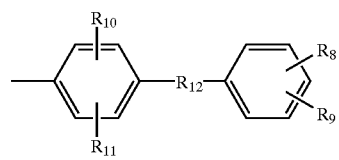

XIII in which
  $R_8$, $R_9$, $R_{10}$ and $R_{11}$ independently of one another are hydrogen, halogen such as fluorine, chlorine, bromine or iodine or $C_1$-$C_{18}$alkyl,
  —E—$C_1$-$C_{18}$alkyl, —CN, —$NO_2$, trifluoromethyl, $C_5$-$C_6$cycloalkyl or

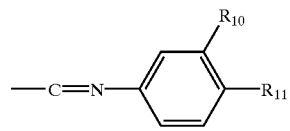

and in particular hydrogen, $C_1$-$C_5$alkyl such as methyl, ethyl, propyl, isopropyl, n-butyl, isobutyl, sec-butyl, tert-butyl, n-pentyl, sec-amyl or tert-amyl, or halogen such as Cl or Br, and
  $R_{12}$ is a single bond, —$CH_2$—, —$CH(CH_3)$—, —$C(CH_3)_2$—, —CH=N—, —N=N—, —O—, —S—, —SO—, —$SO_2$— or —$NR_3$—.

With particular preference, halo-DPP of the formula IIb together with $G_6$ is an organic radical such as

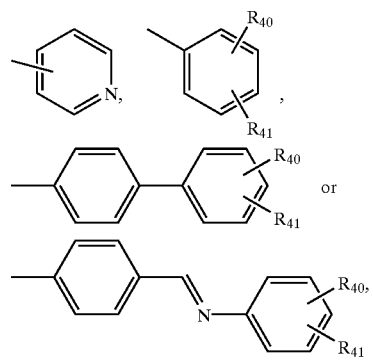

in which
  $R_{40}$ and $R_{41}$ independently of one another are hydrogen, halogen such as fluorine, chlorine, bromine or iodine, or $C_1$–$C_{18}$alkyl, —E—$C_1$–$C_{18}$alkyl, —CN, —$NO_2$ or trifluoromethyl.

With very particular preference $G_6$ is an organic radical such as

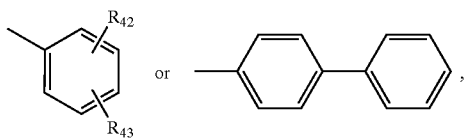

in which $R_{42}$ and $R_{43}$ independently of one another are hydrogen, chlorine, methyl, tert-butyl or —CN.

In one preferred embodiment the halogenated phenyl group $G_2$ employed is a compound of the formula XIV

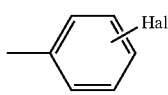

XIV in which Hal is halogen such as fluorine, chlorine, bromine or iodine, preferably chlorine or bromine. With particular preference, halogen is in the para position.

If desired, the halogenated phenyl group $G_2$ can be a compound of the formula XV

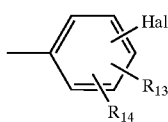

XV and can carry further substituents, $R_{13}$ or $R_{14}$, where $R_{13}$ and $R_{14}$ independently of one another are, for example, hydrogen, CN, $CF_3$, $C_1$–$C_5$alkyl, $C_5$–$C_6$cycloalkyl, —E—$C_1$–$C_{18}$alkyl, phenyl, S—$R_1$, amides such as —$CONR_3R_4$ or amides of the formulae XVI to XIX

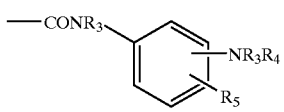

XVI

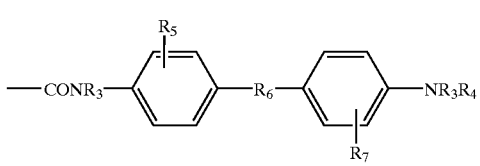

XVII

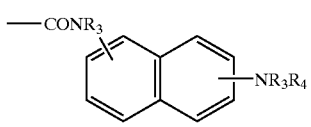

XVIII

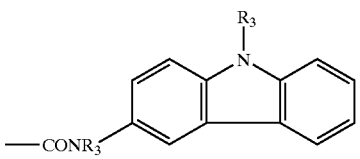

XIX or amides of nitrogen-containing heterocycles such as 1-carbonyl-imidazole, -pyrazole, -triazole, -pyrrole, -pyrrolidine, -benzimidazole or -benzotriazole, or halogen such as fluorine, chlorine, bromine or iodine, preferably chlorine or bromine.

Preferably, $R_{13}$ and $R_{14}$ are in the meta positions.

In a further preference, $R_{14}$ is hydrogen and $R_{13}$ is one of the above substituents other than hydrogen, preferably in the meta position.

In another preferred embodiment the halogenated phenyl group $G_2$ is of the formula XX

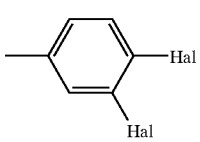

XX in which Hal is preferably fluorine, chlorine, bromine or iodine and, with particular preference, chlorine or bromine.

Halo-DPPs II with correspondingly substituted groups are known, for example, from patents U.S. Pat. No. 5,484,943, U.S. Pat. No. 5,616,725 or U.S. Pat. No. 5,200,528 or are obtainable in accordance with U.S. Pat. No. 4,579,949.

A further embodiment of the present invention relates to new DPPs of the formulae XXI and XXX

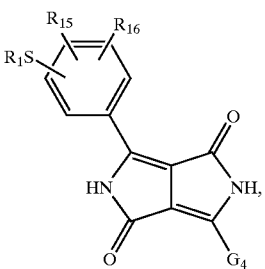

XXI

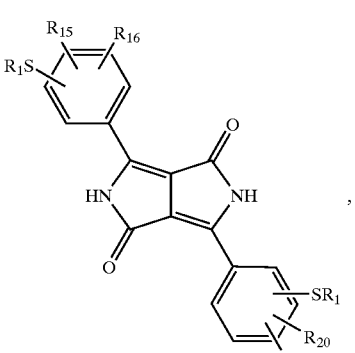

XXX and to novel bis-DPPs of the formula Ib

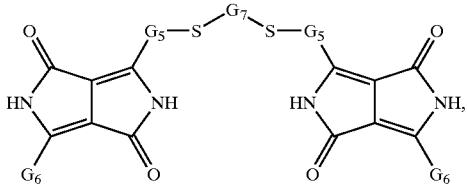

Ib in which $R_{15}$, $R_{16}$, $R_{20}$ and $R_{21}$ independently of one another are hydrogen or $R_{13}$ or $R_{14}$, and $G_4$ is a carbocyclic or heterocyclic radical, with the proviso that (a) $R_1$ in formula XXI is not phenyl if $R_{15}$ and $R_{16}$ are hydrogen and $G_4$ is phenyl, and (b) $R_1$ in formula XXX is not phenylene ($C_1$–$C_4$alkyl) or $C_1$–$C_{12}$alkyl if $R_{15}$, $R_{16}$, $R_{20}$ and $R_{21}$ are hydrogen, and $G_5$ is a phenylene, $G_6$ is a carbocyclic or heterocyclic radical, and $G_7$ is alkylene, cycloalkylene or phenylene.

Preferred DPPs of the formula XXI or XXX are those in which $R_1$ is mono- or polysubstituted or unsubstituted $C_1$–$C_{30}$alkyl or a phenyl radical.

With particular preference, $R_{15}$, $R_{16}$, $R_{20}$ and $R_{21}$ are hydrogen and $R_1$ is —$C_1$–$C_{18}$alkyl, such as $C_4$alkyl, $C_6$alkyl, $C_9$alkyl, $C_{12}$alkyl or $C_{18}$alkyl, and also -(para-parphenylene)-OH, —$CH_2CH_2$OH, —$CH_2C(O)O$—$CH_2CH_3$, —$(CH_2)_2C(O)O$—$CH_2CH_3$—($C_1$–$C_{30}$alkylene)-$N(R_3,R_4)$ such as —$(C_2H_5)$—$N(CH_3)_2$.

Particular preference is given to compounds of the formula Ib in which $G_5$ is 1,4-phenylene and $G_7$ is n-propylene, n-butylene, n-pentylene, n-hexylene, n-heptylene or n-octylene, or substituted or unsubstituted phenylene and $G_6$ is unsubstituted or substituted phenyl.

Very particular preference is given to compounds of the formula Ib in which $G_5$ is 1,4-phenylene and $G_7$ is n-propylene, n-butylene, n-pentylene, n-hexylene, n-heptylene or n-octylene and $G_6$ is unsubstituted phenyl.

Very particular preference is given to compounds of the formula XXXI or XXXII

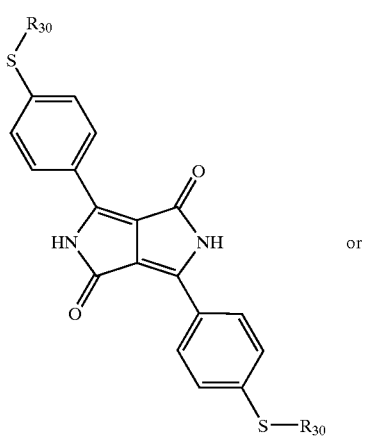

XXXI

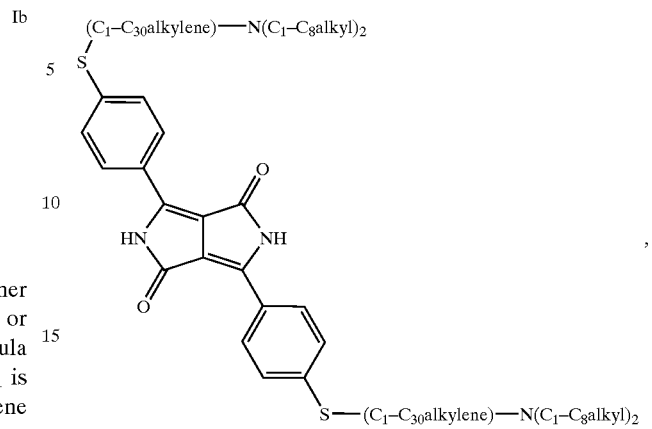

XXXII in which
$R_{30}$ is $C_1$–$C_{30}$alkyl, with particular preference $C_1$–$C_{18}$alkyl and, with very particular preference, $C_5$–$C_8$alkyl.

A further embodiment of the present invention relates to compositions comprising a DPP of the formula Ia and a halo-DPP of the formula IIa, obtainable by the process of the invention using a substoichiometric amount of thiol or thiolate of the formula IIIa. Preferably, the thiol or thiolate of the formula IIIa is employed in a molar ratio that is within the range from 0.1 to 49%, based on the total amount of thiol or thiolate of the formula IIIa and halo-DPP of the formula IIa.

A further embodiment of the process of the invention relates to compositions comprising at least two differently substituted DPPs of the formula Ia. These compositions are obtainable either by reacting at least two differently substituted halo-DPPs of the formula IIa with a thiol or thiolate of the formula IIIa or, conversely, by reacting at least two differently substituted thiols or thiolates of the formula IIIa with a halo-DPP of the formula IIa.

The molar ratio of thiol or thiolate of the formula IIIa to differently substituted halo-DPPs of the formula IIa, or of differently substituted thiols or thiolates of the formula IIIa to halo-DPP of the formula IIa, is generally chosen to be within the range from 20:0.1 to 1:1, preferably in the range from 10:1 to 5:1 and, with very particular preference, within the range from 5:1 to 5:2.

The molar ratio of the differently substituted halo-DPPs of the formula IIa to one another is generally chosen to be within the range from 0.1 to 99.9 mol-%, based on the total amount of differently substituted halo-DPPs of the formula IIa, and is preferably in the range from 20 to 80 mol-% and, with particular preference, in the range from 40 to 60 mol-%.

The molar ratio of differently substituted thiols or thiolates of the formula IIIa to one another is generally chosen to be within the range from 0.1 to 99.9 mol-%, based on the total amount of differently substituted thiols or thiolates of the formula IIIa, is preferably within the range from 20 to 80 mol-% and, with particular preference, in the range from 40 to 60 mol-%.

The invention relates, furthermore, to compositions comprising a DPP of the formula XXI and/or XXX and/or DPP Ia and/or Ib and diketo-diaryl-pyrrolopyrrole (DPP) or a DPP latent pigment, wherein DPPs of formula XXI and Ia, or XXX and Ib are different. DPP latent pigments are described, for example, in U.S. Pat. No. 5,616,725. In a preferred embodiment, the molar ratio of DPP of the formula XXI and/or XXX to DPP, DPP of the formula Ia or Ib, or DPP latent pigment is chosen to be within the range from 0.1 to 99.9 mol-%, based on the total amount of DPP of the formula XXI or XXX, DPP or DPP latent pigment, more preferably from 20 to 80 mol-% and, with particular preference, from 40 to 60 mol-%.

These compositions of the invention can be prepared by customary methods, for example, by mixing the individual components with one another in accordance with the customary methods, in analogy, for example, to the method described in U.S. Pat. No. 5,200,528.

The DPPs can be prepared by customary methods as described in U.S. Pat. No. 5,200,528. Similarly, the DPP latent pigments can be prepared in analogy to the method described in U.S. Pat. No. 5,561,232.

Furthermore, the invention relates to the use of DPP of the formula Ia and/or Ib as rheology enhancers or as crystal growth inhibitors.

A further embodiment of the present invention relates to the use of DPPs of the formula XXI or XXX as rheology enhancers or as crystal growth inhibitors.

In addition, the invention relates to a rheology enhancer or crystal growth inhibitor comprising DPP of the formula Ia and/or Ib.

In common practice the rheology enhancers or crystal growth inhibitors are used in compositions comprising DPP of the formula Ia and/or Ib and DPP or DPP latent pigment.

A further embodiment of the present invention relates to compositions comprising DPP of the formula Ia and/or Ib and DPP or DPP latent pigment.

The present invention relates further to a method of enhancing rheology or of inhibiting crystal growth which comprises incorporating an effective amount of DPP of the formula Ia and/or Ib in DPP or a DPP latent pigment.

The molar ratio of DPP of the formula Ia and/or Ib is usally in the range from 0.1 to 20 mol-% based on of DPP of the formula Ia and/or Ib and DPP or DPP latent pigment.

Furthermore, the present invention relates to the use of DPP of the formula XXI or XXX or bis-DPP Ib, or of a composition comprising a DPP of the formula XXI and/or XXX and/or DPP Ia and/or Ib and diketo-diarylpyrrolopyrrole (DPP) or a DPP latent pigment, wherein DPPs of formula XXI and Ia, or XXX and Ib are different, for colouring/pigmenting high molecular mass organic material.

The invention additionally relates to a method of colouring/pigmenting high molecular mass organic material which comprises incorporating a colouristically effective amount of DPP of the formula XXI or XXX or of bis-DPP Ib, or of a composition comprising a DPP of the formula XXI and/or XXX and/or DPP Ia and/or Ib and diketo-diarylpyrrolopyrrole (DPP) or a DPP latent pigment, wherein DPPs of formula XXI and Ia, or XXX and Ib are different, therein, by conventional methods, as described, for example, in U.S. Pat. No. 5,200,528.

In addition, the invention relates to compositions comprising high molecular mass organic material and DPP of the formula XXI or XXX or bis-DPP of the formula Ib.

In general the weight ratio of DPP of the formula XXI or XXX or bis-DPP of the formula Ib or the compositions of the invention is from 0.01 to 30% by weight, preferably from 0.1 to 10% by weight, based on the high molecular mass organic material.

Another preferred embodiment of the present invention relates to compositions consisting of high molecular mass organic material and DPP of the formula XXI or XXX or bis-DPP of the formula Ib and also compositions consisting of DPP of the formula XXI or XXX or bis-DPP of the formula Ib and/or high molecular mass organic material and/or DPP of the formula Ia and also compositions consisting of DPP of the formula XXI or XXX and/or high molecular mass organic material and/or DPPs and also compositions consisting of DPP of the formula XXI or XXX and/or high molecular mass organic material and/or DPP latent pigments and also compositions consisting of DPP of the formula XXI or XXX and/or high molecular mass organic material and/or halo-DPP of the formula IIa and also compositions consisting of DPP of the formula Ib and/or high molecular mass organic material and/or halo-DPP of the formula IIb.

High molecular mass organic materials can be of natural or synthetic origin. They may, for example, comprise natural resins or drying oils, rubber or casein, or modified natural substances, such as cellulose ethers or esters, cellulose acetate, cellulose propionate, cellulose acetobutyrate or nitrocellulose, and especially entirely synthetic organic polymers (thermosets and thermoplastics) as obtained by addition polymerization, polycondensation, or polyaddition. From the class of the addition-polymerization resins mention may be made primarily of polyolefins, such as polyethylene, polypropylene or polyisobutylene, and also substituted polyolefins, such as addition polymers of vinyl chloride, vinyl acetate, styrene, acrylonitrile, acrylates and/or methacrylates or butadiene, and also addition copolymers of the abovementioned monomers, especially acrylonitrile-butadiene-styrene (ABS) or ethylene-vinyl acetate (EVA).

From the series of the polyaddition resins and polycondensation resins mention may be made of the condensation products of formaldehyde with phenols, known as phenolic resins, and of the condensation products of formaldehyde with urea, thiourea and melamine, known as amino resins, the polyesters used as film-forming resins, both saturated, such as alkyd resins, and unsaturated, such as maleate resins, and also the linear polyesters and polyamides, and silicones.

The abovementioned high molecular mass organic materials can be present individually or in mixtures, as plastic masses or melts which can if desired be spun to fibre.

They can also be present in the form of their monomers or in the polymerized state in dissolved form as film formers or binders for coating materials or printing inks, such as linseed oil varnish, nitrocellulose, alkyd resins, melamine resins and urea-formaldehyde resins, or acrylic resins.

The colouring/pigmentation of the high molecular mass organic substances with the DPPs of the formula XXI or XXX or bis-DPP of the formula Ib or compositions of the invention comprising them takes place in general with the resultant crude product of the process of the invention, or following appropriate conditioning and aftertreatment, for example, in such a way that DPP of the formula XXI or XXX or bis-DPP of the formula Ib or compositions of the invention comprising them, as they are or in the form of master batches, are admixed to these substrates using roll mills or mixing or milling apparatus. The coloured/pigmented material is generally brought into the desired final form by techniques known per se, such as callendering, compression moulding, extrusion, spreading, pouring or injection moulding. It is often desirable, in order to produce nonrigid mouldings or to reduce their brittleness, to add plasticizers to the high molecular mass compounds prior to their forming. Examples of such plasticizers are esters of phosphoric, phthalic or sebacic acid. The plasticizers can be incorporated into the polymers before or after the incorporation of the colorant. It is also possible, in order to obtain different shades, to add fillers and/or other colouring constituents, such as white, coloured or black pigments in the desired amount to the high molecular mass organic substances in addition to DPPs of the formula XXI or XXX or bis-DPPs of the formula Ib.

For pigmenting coating materials and printing inks, the high molecular mass organic materials and DPPs of the formula XXI or XXX or bis-DPP of the formula Ib or compositions of the invention comprising them alone or together with additives such as fillers, other pigments, siccatives or plasticizers are customarily dissolved or finely dispersed in a common organic solvent or solvent mixture. In this context it is possible to follow a procedure whereby the individual components are dispersed or dissolved individually or else two or more are dissolved or dispersed together and only then are all the components combined.

The resultant brightly coloured/pigmented high molecular mass materials, examples being plastics, fibres, coatings and prints, are notable for very high colour strength, high saturation, good dispersibility, high fastness to overcoating, heat, light and weather, and high lustre.

The process of the invention allows the preparation of a broad range of thio-substituted DPPs of the formula Ia, and even of long-chain alkylthio-DPPs and water-soluble DPPs, and also of dithio-bridged bis-DPPs of the formula Ib. The DPPs of the formula Ia, the bis-DPPs of the formula Ib and the compositions of the invention comprising a DPP of formula XXI or XXX are colorants of high lustre and transparency. The DPPs of the formula Ia and also the compositions of the invention comprising a DPP of formula XXI or XXX are particularly suitable for inhibiting crystal growth and enhancing rheology. The novel compounds or compositions and the compounds prepared by the process of this invention have good warp fastness properties in high molecular weight material, in particular in material that is processed by the injection moulding process using the novel compounds or compositions. Preferred high molecular weight materials are, for example, polyolefins. The high yields obtained with the process of the invention, and its simplicity, which permits operation without elevated pressure and without catalysts, moreover, are a guarantee of good economics.

EXAMPLES

Example 1

Reaction of 1-Octadecanethiol with Diketobis(4-chlorophenyl)pyrrolopyrrole (DPP of the Formula XXII,=halo-DPP of the Formula IIa with $G_2=G_3=$para-Cl-Phenyl)

17.19 g (60 mmol) of 1-octadecanethiol dissolved in 60 ml of dimethylacetamide, DMA, are added dropwise under nitrogen to a red suspension of 10.72 g (30 mmol) of DPP XXII and 9.95 g (72 mmol) of potassium carbonate in 260 ml of DMA. The resultant mixture is then heated at 393 K for 24 hours, during which it turns violet.

Workup and Isolation

The reaction mixture is cooled to room temperature and then poured into 60 ml of ice water. The aqueous reaction mixture is filtered. The filter residue is washed with methanol and then with water and subsequently dried in vacuo at 353 K. This gives 24.37 g (94.7% of theory by weight) of a red pigment.

Examples 2–10 see Tables 1, 2, 3 and 4 below

Examples 11–21

The reactions take place in analogy to that of Example 1 but, in contradistinction to Example 1, using instead of the DPP of the formula XXII in Example 11 diketo-4,4'-dibromo(diphenyl) pyrrolopyrrole (DPP of the formula IIa with $G_2=G_3=$para-Br-phenyl);

in Examples 12 and 13 diketo-4,4',3,3'-tetrachloro (diphenyl)pyrrolopyrrole (DPP of the formula IIa with $G_2=G_3=$para,meta-dichlorophenyl);

in Example 14 diketo-4-chloro(diphenyl)pyrrolopyrrole, (DPP of the formula IIa with $G_2 \neq G_1$; $G_2=$para-chlorophenyl and $G_1=$phenyl);

in Example 15 diketo-4-chloro-4-methyl(diphenyl) pyrrolopyrrole (DPP of the formula IIa with $G_2 \neq G_1$; $G_2=$para-chlorophenyl and $G_1=$para-methylphenyl);

in Example 16 diketo-4-chloro-4-tert-butyl(diphenyl) pyrrolopyrrole (DPP of the formula IIa with $G_2 \neq G_1$; $G_2=$para-chlorophenyl and $G_1=$para-tert-butylphenyl);

in Example 17 diketo-4-chloro-4-phenyl(diphenyl) pyrrolopyrrole (DPP of the formula IIa with $G_2 \neq G_1$; $G_2=$para-chlorophenyl and $G_1=$para-phenylphenyl);

in Example 18 diketo-3-bromo(diphenyl)pyrrolopyrrole (DPP of the formula IIa with $G_2 \neq G_1$; $G_2=$meta-bromophenyl and $G_1=$phenyl);

in Examples 19–21 (Dregaration of bis-DPP) diketo-4-chloro-4-phenyl(diphenyl)pyrrolopyrrole (DPP of the formula IIb with $G_2=$para-chlorophenyl and $G_6=$phenyl) is employed and in Examples 22–28 the reaction takes place in analogy to that of Example 1 but, in contradistinction to Example 1, using instead of the DPP of the formula XXII in Example 22 (composition comprising a halo-DPP XXII and a DPP IIa with $G_2=G_3=$para-Cl-phenyl) thiol in a substoichiometric amount with respect to halo-DPP XXII, and in Example 23 using in this case 1,3-dimethyl-3,4,5,6-tetrahydro-3(1H)pyrimidinone instead of the solvent DMA, and in Examples 24–28 varying the bases.

TABLE 1

Examples 1–28, whose reaction takes place in analogy to that of Example 1, the altered starting materials, experimental parameters and yields being indicated in the table.

| Example | Amount of DPP (g) | Thiol | Amount of thiol dissolved in solvent (ml) | Amount of solvent (ml) | Base | Amount of Base (g) | Reaction time/ temp. (h)/(K.) |
|---|---|---|---|---|---|---|---|
| 1 | 10.72 | 1-octadecanethiol | 17.19 g in 60 ml DMA | 260 ml DMA | $K_2CO_3$ | 9.95 | 24/393 |
| 2 | 10.72 | 2-mercaptoethanol | 4.21 ml in 40 ml DMA | 260 ml DMA | $K_2CO_3$ | 9.95 | 2/393 |
| 3 | 10.72 | 1-nonanethiol | 9.62 ml in 40 ml DMA | 260 ml DMA | $K_2CO_3$ | 9.95 | 4.5/403 |

TABLE 1-continued

Examples 1–28, whose reaction takes place in analogy to that of Example 1, the altered starting materials, experimental parameters and yields being indicated in the table.

| Example | Amount of DPP (g) | Thiol | Amount of thiol dissolved in solvent (ml) | Amount of solvent (ml) | Base | Amount of Base (g) | Reaction time/ temp. (h)/(K.) |
|---|---|---|---|---|---|---|---|
| 4 | 10.72 | ethyl thioglycolate | 7.24 g in 40 ml **DMSO | 260 ml **DMSO | $K_2CO_3$ | 9.95 | 19/371 |
| 5 | 10.72 | p-methylthiophenol | 7.45 g in 40 ml DMA | 260 ml DMA | $K_2CO_3$ | 9.95 | 18.5/383 |
| 6 | 10.72 | 4-mercaptophenol | 9.25 g in 40 ml DMA | 260 ml DMA | $K_2CO_3$ | 9.95 | 17/393–403 |
| 7 | 10.02 | 1-propanethiol | 6.39 g in 30 ml DMA | 230 ml DMA | $K_2CO_3$ | 9.28 | 19.5/403 |
| 8 | 10.72 | 1-dodecanethiol | 15.18 g in 50 ml DMA | 350 ml DMA | $K_2CO_3$ | 10.36 | 16/393 |
| 9 | 5.36 | 2-dimethylaminoethanethiol | 6.37 g in 40 ml **DMSO | 130 ml **DMSO | $K_2CO_3$ | 4.98 | 22.5/383 |
| 10 | 5.36 | 1-hexanethiol | 3.55 g in 40 ml DMA | 170 ml DMA | $K_2CO_3$ | 4.98 | 18.3/393 |
| 11 | 5.35 | 1-octadecanethiol | 10.32 g in 20 ml DMA | 130 ml DMA | $K_2CO_3$ | 4.98 | 6.25/413 |
| 12 | 2.34 | 1-nonanethiol | 5.29 in 10 ml DMA | 70 ml DMA | $K_2CO_3$ | 1.82 | 18.5/393 |
| 13 | 2.34 | 1-nonanethiol | 5.29 in 10 ml DMSO** | 80 ml DMSO** | $K_2CO_3$ | 1.82 | 18.5/393 |
| 14 | 9.04 | 2-dimethylaminoethanethiol | 8.35 g in 30 ml DMSO** | 250 ml DMSO** | $K_2CO_3$ | 1.82 | 20/373 |
| 15 | 10.1 | 2-dimethylaminoethanethiol | 8.35 g in 30 ml DMSO** | 250 ml DMSO** | $K_2CO_3$ | 1.82 | 20/373 |
| 16 | 5.68 | 2-dimethylaminoethanethiol | 8.35 g in 30 ml DMSO** | 250 ml DMSO** | $K_2CO_3$ | 1.82 | 20/373 |
| 17 | 9.97 | 2-dimethylaminoethanethiol | 8.35 g in 30 ml DMSO** | 250 ml DMSO** | $K_2CO_3$ | 1.82 | 20/373 |
| 18 | 4.04 | 1-octadecanethiol | 6.3 g in 10 ml DMA | 130 ml DMA | $K_2CO_3$ | 3.65 | 6/403 |
| 19 | 4.84 | 1,3-propanedithiol | 1.62 g | 100 ml DMA | $K_2CO_3$ | 2.9 | 6/380 |
| 20 | 4.84 | 1,5-pentanedithiol | 2.04 g | 100 ml DMA | $K_2CO_3$ | 2.9 | 6/380 |
| 21 | 4.84 | 1,5-hexanedithiol | 1.41 g | 100 ml DMA | $K_2CO_3$ | 2.9 | 6/380 |
| 22 | 5.36 | 2-dimethylaminoethanethiol | 1.06 g in 20 ml DMSO | 130 ml DMSO | $K_2CO_3$ | 2.07 | 0.5/353 |
| 23 | 10.72 | 1-octadecanethiol | 17.19 g in 60 ml ˆ | 260 ml ˆ | $K_2CO_3$ | 9.95 | 24/393 |
| 24 | 10.72 | 1-octadecanethiol | 17.19 g in 60 ml | 260 ml | $Na_2CO_3$ | 9.95 | 24/393 |
| 25 | 10.72 | 1-octadecanethiol | 17.19 g in 60 ml | 260 ml | $KHCO_3$ | 9.95 | 24/393 |
| 26 | 10.72 | 1-octadecanethiol | 17.19 g in 60 ml | 260 ml | Na | 9.95 | 24/393 |
| 27 | 10.72 | 1-octadecanethiol | 17.19 g in 60 ml | 260 ml | KOH | 9.95 | 24/393 |
| 28 | 10.72 | 1-octadecanethiol | 17.19 g in 60 ml | 260 ml | NaOH | 9.95 | 24/393 |

**DMSO is dimethyl sulfoxide
ˆ 1,3-Dimethyl-3,4,5,6-tetrahydro-3(1H)pyrimidinone

TABLE 2

Examples 1–28, whose workup and isolation takes place in analogy to that of Example 1:

| Example | Amount of ice water (ml) | Methanol (ml) | Water | Drying temperature (K.) | Yield (g/% of theory by weight) |
|---|---|---|---|---|---|
| 1 | 600 | + | + | 353 | 24.37 g/94.7% |
| 2 | 600 | 300* | + | 353 | 12.21 g/92.4% |
| 3 | 600 | – | (1.5 l) | 353 | 16.83 g/92.7% |
| 4 | 600*** | + | + | 343 | 12.65 g/80.4% |
| 5 | 600 | + | (1 l) | 343 | 14.96 g/93.4% |
| 6 | 600 | (150 ml) | – | 343 | 15.17 g/94.2% |
| 7 | 500 | (1.5 l) | (1.5 l) | 343 | 9.98 g/81.4% |
| 8 | 700 | (1 l) | (0.8 l) | 353 | 19 g/92.1% |
| 9 | 300 | (1 l) | (0.5 l) | 343 | 7.12 g/96.0% |
| 10 | 300 | (1 l) | (0.5 l) | 343 | 7.11 g/91.0% |
| 11 | 300 | (1.5 l)**** | (1 l)**** | 343 | 8.5 g/82.6% |
| 12 | 200 | – | (0.5 l)***** | 343 | 1.82 g/49.1% |
| 13 | 200 | – | (0.5 l)***** | 343 | 2.41 g/65.0% |
| 14 | 500 | + (1.5 l) | + (1 l) | 343 | 10.6 g/96.7% |
| 15 | 500 | + (1.5 l) | + (1 l) | 343 | 11.88 g/97.65% |
| 16 | 500 | (1.5 l) | (1 l) | 343 | 6.6 g/98% |
| 17 | 500 | (1.5 l) | (1 l) | 343 | 10.76 g/92% |
| 18 | 300 | (1.5 l) | (0.75 l) | 343 | 5.74 g/91.1% |
| 19 | 200 | (0.5 l) | (0.2 l)****** | 343 | 4.53 g/88.7% |
| 20 | 200 | (0.5 l) | (0.2 l)****** | 343 | 5.22 g/98.2% |
| 21 | 200 | (0.5 l) | (0.2 l)****** | 343 | 5.27 g/97.2% |
| 22 | 300 | (0.5 l) | ******* | 343 | 4.97 g |
| 23 | 600 | + | + | 353 | 94% |
| 24 | 600 | + | + | 353 | 99% |
| 25 | 600 | + | + | 353 | 95% |
| 26 | 600 | + | + | 353 | 96% |

TABLE 2-continued

Examples 1–28, whose workup and isolation takes place in analogy to that of Example 1:

| Example | Amount of ice water (ml) | Methanol (ml) | Water | Drying temperature (K.) | Yield (g/% of theory by weight) |
|---|---|---|---|---|---|
| 27 | 600 | + | + | 353 | 98% |
| 28 | 600 | + | + | 353 | 99% |

"+" means: component is used in the reaction
"−" means: component is not used in the reaction
*Example 2: The filter residue is taken up in 300 ml of methanol and stirred at room temperature, T 295 K., for 12 h. The methanolic reaction mixture is filtered. The filter residue is washed with water.
***Example 4: The reaction mixture is poured into 600 ml of ice water and neutralized with concentrated hydrochloric acid until the pH reaches 7. The aqueous reaction mixture is filtered. The filter residue is washed with methanol and water.
****Example 11: After the filter residue has been washed with methanol and then with water, it is admixed with ethyl acetate, heated to boiling temperature and stirred at this temperature for 2 hours. The reaction mixture is subsequently filtered and the filter residue is dried in vacuo at 343 K..
*****Examples 12 and 13: After the filter residue has been washed with water, it is admixed with ethyl acetate, heated to boiling temperature and stirred at this temperature for 6 hours. The reaction mixture is subsequently filtered and the filter residue is dried in vacuo at 343 K..
****Examples 19–21: As under *** but using DMA in this case instead of ethyl acetate.
*******Example 22: After the filter residue has been washed with water, it is admixed with 300 ml of methanol/water (1:1) and stirred at room temperature. The reaction mixture is subsequently filtered and the filter residue is washed with 300 ml of methanol and then with 300 ml of water and subsequently dried in vacuo at 343 K..

TABLE 3

Elemental analyses of Examples 1–21

| | Analysis: | C | H | N | Cl | S |
|---|---|---|---|---|---|---|
| Example 1: | calculated: | 75.65% | 9.87% | 3.27% | — | 7.48% |
| | found: | 75.61% | 9.67% | 3.38% | — | 7.46% |
| Example 2: | calculated: | 59.98% | 4.58% | 6.36% | — | 14.56% |
| | found: | 59.67% | 4.66% | 6.25% | — | 14.66% |
| Example 3: | calculated: | 71.48% | 8.00% | 4.63% | — | 10.60% |
| | found: | 71.40% | 8.10% | 4.38% | — | 10.46% |
| Example 4: | calculated: | 59.53% | 4.61% | 5.34% | — | 12.22% |
| | found: | 59.74% | 4.16% | 6.05% | — | 12.22% |
| Example 5: | calculated: | 72.16% | 4.54% | 5.26% | — | 12.04% |
| | found: | 72.25% | 4.54% | 5.25% | — | 11.96% |
| Example 6: | calculated: | 67.15% | 3.76% | 5.22% | — | 11.95% |
| | found: | 65.73% | 4.19% | 5.52% | — | 11.24% |
| Example 7: | calculated: | 66.03% | 5.54% | 6.42% | — | 14.69% |
| | found: | 66.17% | 5.43% | 6.66% | — | 14.75% |
| Example 8: | calculated: | 73.21% | 8.87% | 4.07% | — | 9.31% |
| | found: | 73.08% | 8.49% | 4.11% | — | 9.28% |
| Example 9: | calculated: | 63.13% | 6.11% | 11.33% | — | 12.96% |
| | found: | 63.17% | 6.13% | 10.73% | — | 13.03% |
| Example 10: | calculated: | 69.19% | 6.97% | 5.38% | — | 12.31% |
| | found: | 69.96% | 6.88% | 5.64% | — | 11.49% |
| Example 11: | calculated: | 75.65% | 9.87% | 3.27% | — | 7.48% |
| | found: | 75.63% | 9.84% | 3.36% | — | 7.30% |
| Example 12: | calculated: | 64.17% | 6.88% | 4.16% | 10.52% | 9.52% |
| | found: | 63.66% | 6.83% | 4.35% | 10.68% | 9.07% |
| Example 13: | calculated: | 69.19% | 6.97% | 5.38% | | 12.31% |
| | found: | 69.96% | 6.88% | 5.64% | | 11.49% |
| Example 14: | calculated: | 69.19% | 6.97% | 5.38% | | 12.31% |
| | found: | 69.96% | 6.88% | 5.64% | | 11.49% |
| Example 15: | calculated: | 69.19% | 6.97% | 5.38% | | 12.31% |
| | found: | 69.96% | 6.88% | 5.64% | | 11.49% |
| Example 16: | calculated: | 69.19% | 6.97% | 5.38% | | 12.31% |
| | found: | 69.96% | 6.88% | 5.64% | | 11.49% |
| Example 17: | calculated: | 69.19% | 6.97% | 5.38% | | 12.31% |
| | found: | 69.96% | 6.88% | 5.64% | | 11.49% |
| Example 18: | calculated: | 69.19% | 6.97% | 5.38% | | 12.31% |
| | found: | 69.96% | 6.88% | 5.64% | | 11.49% |
| Example 19: | calculated: | 68.81% | 4.15% | 8.23% | | 9.42% |
| | found: | 68.82% | 3.99% | 8.37% | | 9.56% |
| Example 20: | calculated: | 69.47% | 4.55% | 7.9% | | 9.05% |
| | found: | 69.32% | 4.71% | 7.86% | | 9.52% |
| Example 21: | calculated: | 69.79% | 4.74% | 7.75% | | 8.87% |
| | found: | 69.32% | 4.63% | 7.67% | | 9.43% |

TABLE 4

List of compounds of Examples 1 to 28

[Structure: 3,6-diaryl-pyrrolo[3,4-c]pyrrole-1,4-dione with R17, R19 on one phenyl ring and R25, R18 on the other phenyl ring]

| | Examples |
|---|---|
| $R_{17}, R_{18}$ = —S—$(CH_2)_{17}CH_3$<br>$R_{19}, R_{25}$ = H | 1, 23–28 and 22<br>(Example 22 composition with halo-DPP) |
| $R_{17}, R_{18}$ = —S—$(CH_2)_2$—OH<br>$R_{19}, R_{25}$ = H | 2 |
| $R_{17}, R_{18}$ = —S—$(CH_2)_8CH_3$<br>$R_{19}, R_{25}$ = H | 3 |
| $R_{17}, R_{18}$ = —S—$CH_2$—COO—$CH_2CH_3$<br>$R_{19}, R_{25}$ = H | 4 |
| $R_{17}, R_{18}$ = —S-phenyl-(paramethyl)<br>$R_{19}, R_{25}$ = H | 5 |
| $R_{17}, R_{18}$ = —S-phenyl-(parahydroxy)<br>$R_{19}, R_{25}$ = H | 6 |
| $R_{17}, R_{18}$ = —S—$(CH_2)_2CH_3$<br>$R_{19}, R_{25}$ = H | 7 |
| $R_{17}, R_{18}$ = —S—$(CH_2)_{11}CH_3$ | 8 |
| $R_{17}, R_{18}$ = —S—$(CH_2)_2N(CH_3)_2$<br>$R_{19}, R_{25}$ = H | 9 |
| $R_{17}, R_{18}$ = —S—$(CH_2)_5CH_3$<br>$R_{19}, R_{25}$ = H | 10 |
| $R_{17}, R_{18}$ = —S—$(CH_2)_{17}CH_3$<br>$R_{19}, R_{25}$ = H | 11 |
| $R_{17}, R_{18}$ = —S—$(CH_2)_8CH_3$<br>$R_{19}, R_{25}$ = Cl | 12, 13 |
| $R_{17}$ = —S—$(CH_2)_2N(CH_3)_2$<br>$R_{19}, R_{25}, R_{18}$ = H | 14 |
| $R_{17}$ = —S—$(CH_2)_2N(CH_3)_2$<br>$R_{19}, R_{25}$ = H<br>$R_{18}$ = —$CH_3$ | 15 |
| $R_{17}$ = —S—$(CH_2)_2N(CH_3)_2$<br>$R_{19}, R_{25}$ = H<br>$R_{18}$ = —$C(CH_3)_3$ | 16 |
| $R_{17}$ = —S—$(CH_2)_2N(CH_3)_2$<br>$R_{19}, R_{25}$ = H<br>$R_{18}$ = -phenyl | 17 |
| $R_{19}$ = —S—$(CH_2)_{17}CH_3$<br>$R_{17}, R_{25}, R_{18}$ = H | 18 |

TABLE 4-continued

List of compounds of Examples 1 to 28

[Structure: 3-phenyl-6-(4-(S-G7-S)2-phenyl)-pyrrolo[3,4-c]pyrrole-1,4-dione, bracketed ×2]

| | Examples |
|---|---|
| $G_7$ = propylene | 19 |
| $G_7$ = pentylene | 20 |
| $G_7$ = hexylene | 21 |

What is claimed is:

1. A process for preparing an alkylthio- and/or arylthio-substituted diketo-diaryl-pyrrolopyrrole (DPP) of the formula Ia

[Structure Ia: pyrrolopyrrole with G and $G_1$ substituents]

in which in formula Ia
    G is phenyl substituted by at least one arylthio or alkylthio group, and
    $G_1$ is G or a carbocyclic or heterocyclic radical, by reacting a haloaryl with a thiol or thiolate, which comprises
    reacting a thiol or thiolate with a halo-diketo-diaryl-pyrrolopyrrole ("halo-DPP") of the formula IIa

[Structure IIa: pyrrolopyrrole with $G_2$ and $G_3$ substituents]

in which
    $G_2$ is a halogenated phenyl group and $G_3$ is $G_2$ or $G_1$.

2. A process according to claim 1, wherein the thiol or thiolate employed is a compound of the formula IIIa $$R_1\text{—}SR_2 \qquad \text{IIIa,}$$

in which
    $R_1$ is $C_1$–$C_{30}$alkyl which can be uninterrupted or interrupted one or more times by heteroatoms —O— or —S—, or by —NH—, —C(O)O—, —O—C(O)— or —C(O)—NH—, and is substituted or unsubstituted, or is $C_5$–$C_{12}$cycloalkyl or phenyl, each of which is substituted or unsubstituted, and $R_2$ is hydrogen, a cation ("M") of an alkali metal, or an organic nitrogen base.

3. A process according to claim 2, wherein the substituents of the alkyl radical, of the cycloalkyl radical or of the phenyl radical are $C_1$–$C_{18}$alkyl, $OR_3$, S—$R_3$, C(O)$R_3$, COO$R_3$, —OCO$R_3$, SO$_3R_3$, SO$_2R_3$, PO$_3R_3$, Si(OR)$_3$, a salt radical such as S—M, O—M, COOM, SO$_3$M, PO$_3$M, P($R_3$)$_3^+$X$^-$, P(($R_3$)$_2R_4$)$_3^+$X$^-$, NO$_2$, N($R_3$)$_3^+$X$^-$, N(($R_3$)$_2R_4$)$_3^+$X$^-$ or a nitrogen-containing radical, in which $R_3$ and $R_4$ independently of one another are hydrogen, $C_1$–$C_{18}$alkyl, $C_5$–$C_6$cycloalkyl or unsubstituted or $R_7$-substituted phenyl, M is a cation of an alkali metal, X$^-$ is a halide, and $R_7$ is hydrogen, halogen or is $C_1$–$C_8$alkyl or unsubstituted or NR$_3R_4$-substituted $C_5$–$C_6$cycloalkyl.

4. A process according to claim 1, wherein $G_2$ in halo-DPP of the formula IIa is an unsubstituted or substituted, halogenated phenyl group and $G_3$ is $G_2$ or $G_1$.

5. A process according to claim 1 or 4, wherein $G_2$ is a compound of the formula XV

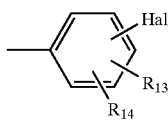

XV in which Hal is fluorine, chlorine, bromine or iodine and $R_{13}$ and $R_{14}$ independently of one another are hydrogen, CN, CF$_3$, $C_1$–$C_5$alkyl, $C_5$–$C_6$cycloalkyl, —E—$C_1$–$C_{18}$alkyl, phenyl, S—$R_1$, —CONR3R4 or amides of the formulae XVI to XIX

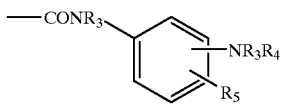

XVI

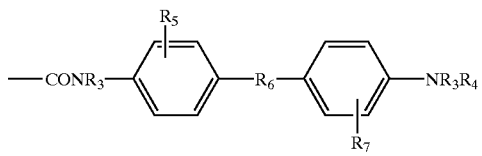

XVII

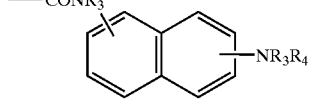

XVIII

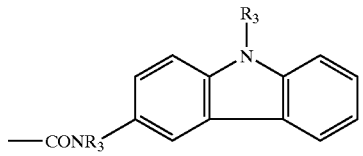

XIX or amides of nitrogen-containing heterocycles or halogen; E is —O—, —S—, —NH—, —C(O)O—, —OC(O)—, —C(O)NH— or —NHC(O)—; $R_1$ is $C_1$–$C_{30}$alkyl which can be uninterrupted or interrupted one or more times by heteroatoms —O— or —S—, or by —NH—, —C(O)O—, —O—C(O)— or —C(O)—NH—, and is substituted or unsubstituted, or is $C_5$–$C_{12}$cycloalkyl or phenyl, each of which is substituted or unsubstituted; $R_3$ and $R_4$ independently of one another are hydrogen, $C_1$–$C_{18}$alkyl, $C_5$–$C_6$cycloalkyl or unsubstituted or $R_7$-substituted phenyl; $R_5$ independently of $R_7$ has the same definition as $R_7$; $R_6$ is a direct bond, —CH$_2$—, —CH(CH$_3$)—, —C(CH$_3$)$_2$—, —CH=N—, —N=N—, —O—, —S—, —SO—, —SO$_2$— or —NR$_3$—; and $R_7$ is hydrogen, halogen or is $C_1$–$C_8$alkyl or unsubstituted or NR$_3R_4$-substituted $C_5$–$C_6$cycloalkyl.

6. A process according to claim 1, wherein the reaction is conducted in the presence of a base.

7. A process according to claim 1, wherein the reaction is conducted in the presence of a solvent.

* * * * *